(12) United States Patent
Staskevich et al.

(10) Patent No.: US 9,481,459 B2
(45) Date of Patent: Nov. 1, 2016

(54) APPARATUS AND METHOD EMPLOYING AUTONOMOUS VEHICLES TO REDUCE RISK

(71) Applicant: THE UNITED STATES OF AMERICA AS REPRESENTED BY THE SECRETARY OF THE AIR FORCE, Washington, DC (US)

(72) Inventors: Gennady Staskevich, Utica, NY (US); Erik P. Blasch, Rome, NY (US); Brian Abbe, Cicero, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 198 days.

(21) Appl. No.: 14/563,072

(22) Filed: Dec. 8, 2014

(65) Prior Publication Data
US 2016/0251081 A1    Sep. 1, 2016

(51) Int. Cl.
| | |
|---|---|
| G05D 1/00 | (2006.01) |
| B64C 39/02 | (2006.01) |
| B64D 47/08 | (2006.01) |
| B60L 11/18 | (2006.01) |
| B64F 1/00 | (2006.01) |
| B64F 1/20 | (2006.01) |
| G05D 1/10 | (2006.01) |
| G06K 9/00 | (2006.01) |
| H04N 7/18 | (2006.01) |

(52) U.S. Cl.
CPC .......... *B64C 39/024* (2013.01); *B60L 11/1829* (2013.01); *B64D 47/08* (2013.01); *B64F 1/007* (2013.01); *B64F 1/20* (2013.01); *G05D 1/0011* (2013.01); *G05D 1/101* (2013.01); *G06K 9/00288* (2013.01); *G06K 9/00442* (2013.01); *H04N 7/185* (2013.01)

(58) Field of Classification Search
None
See application file for complete search history.

(56) References Cited

U.S. PATENT DOCUMENTS

| | | | | |
|---|---|---|---|---|
| 2014/0249692 | A1* | 9/2014 | Levien | B64C 39/024 701/2 |
| 2014/0316614 | A1* | 10/2014 | Newman | G06Q 30/0611 701/3 |
| 2015/0055857 | A1* | 2/2015 | Wang | G06K 9/3258 382/165 |

* cited by examiner

*Primary Examiner* — Adam Alharbi
(74) *Attorney, Agent, or Firm* — Joseph A. Mancini (57) ABSTRACT

Apparatus and method for employing autonomous air vehicles to perform high risk observation, interaction, and interrogation with individuals. Invention comprises an autonomously controlled air vehicle with mounting and transporting means being attachable to automobiles and other first responder vehicle types. Mounting and transporting means serves also as a base station for commanding autonomous air vehicle and relaying communications to and from autonomous air vehicle to and from remote data base sources. Autonomously controlled air vehicle is equipped with a variety of sensors which air in observation and detection of suspects, their vehicles and possessions therein, and any documentation produced during the interrogation.

1 Claim, 8 Drawing Sheets

APPARATUS AND METHOD EMPLOYING AUTONOMOUS VEHICLES TO REDUCE RISK

STATEMENT OF GOVERNMENT INTEREST

The invention described herein may be manufactured and used by or for the Government for governmental purposes without the payment of any royalty thereon.

BACKGROUND OF THE INVENTION

There are real world situations where responsibility requirements put individuals at risk. The following examples such as military force protection, road checks, or pulling over vehicles with drivers can demonstrate the advantages of autonomous vehicle platforms over human interaction. Consider a situation where a security guard or law enforcement officer (LEO) conducting force protection within an area of responsibility. A LEO approaches a stopped vehicle at the road check; the driver turns out to be a wanted felon using someone else's vehicle (e.g., a loaned vehicle from associate) and has a weapon. This situation could rapidly turn tragic for a lone LEO; however, the danger can be significantly reduced or completely mitigated using an autonomous vehicle.

Traditional methods rely on sending human law enforcement operators to do the assessment of the environment. More recent explorations of using remote controlled vehicles have been explored for traffic monitoring, site surveillance, and search as rescue. These methods operate in a benign environment devoid of hostile behaviors of individuals. The present invention combines sensor and communications technologies on an autonomous vehicle platform controlled by a user in a novel way for suspicious object interaction and integrates them in a unique system including but not limited to law enforcement activities to reduce risk.

OBJECTS AND SUMMARY OF THE INVENTION

It is therefore an object of the present invention to provide an apparatus and method that employs an autonomous air vehicle to reduce risk in high risk interactions with individuals.

It is a further object of the present invention to provide a mobile apparatus to transport and deploy an autonomous air vehicle.

It is still a further object of the present invention to provide an apparatus to facilitate bidirectional communications between a deployed autonomous air vehicle, an operator's vehicle, and remoted databases.

It is yet still a further object of the present invention to provide a method for using an autonomous air vehicle to observe and interact with a suspect in high risk situations.

Briefly stated, the present invention achieves these and other objects through employing autonomous air vehicles to perform high risk observation, interaction, and interrogation with individuals. Invention comprises an autonomously controlled air vehicle with mounting and transporting means being attachable to automobiles and other first responder vehicle types. Mounting and transporting means serves also as a base station for commanding autonomous air vehicle and relaying communications to and from autonomous air vehicle to and from remote data base sources. Autonomously controlled air vehicle is equipped with a variety of sensors which air in observation and detection of suspects, their vehicles and possessions therein, and any documentation produced during the interrogation.

According to an embodiment of the invention, an apparatus for employing autonomous vehicles to reduce risk, comprises an autonomously controlled air vehicle and a base station. The autonomously controlled air vehicle comprises an airborne communications module, an airborne processing unit, and a sensor module. The base station comprises a communications unit, a processing unit, a plurality of beacons, a plurality of object tracking means, a landing pad, a data storage unit, and a plurality of mounting means.

According to another embodiment of the present invention, a system having an autonomously controlled air vehicle and a base station capable of communicating with each other, a method for employing that autonomously controlled air vehicle to reduce risk during suspect investigation, comprising the steps of deploying the autonomously controlled air vehicle towards suspect; issuing instructions through the autonomously controlled air vehicle; capturing images of the suspect; capturing images of document which the suspect produces in response to the instructions; communicating the images from the autonomous air vehicle to the base station; performing image comparison; and performing text extraction and classification; and correlating the text and the image identification.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
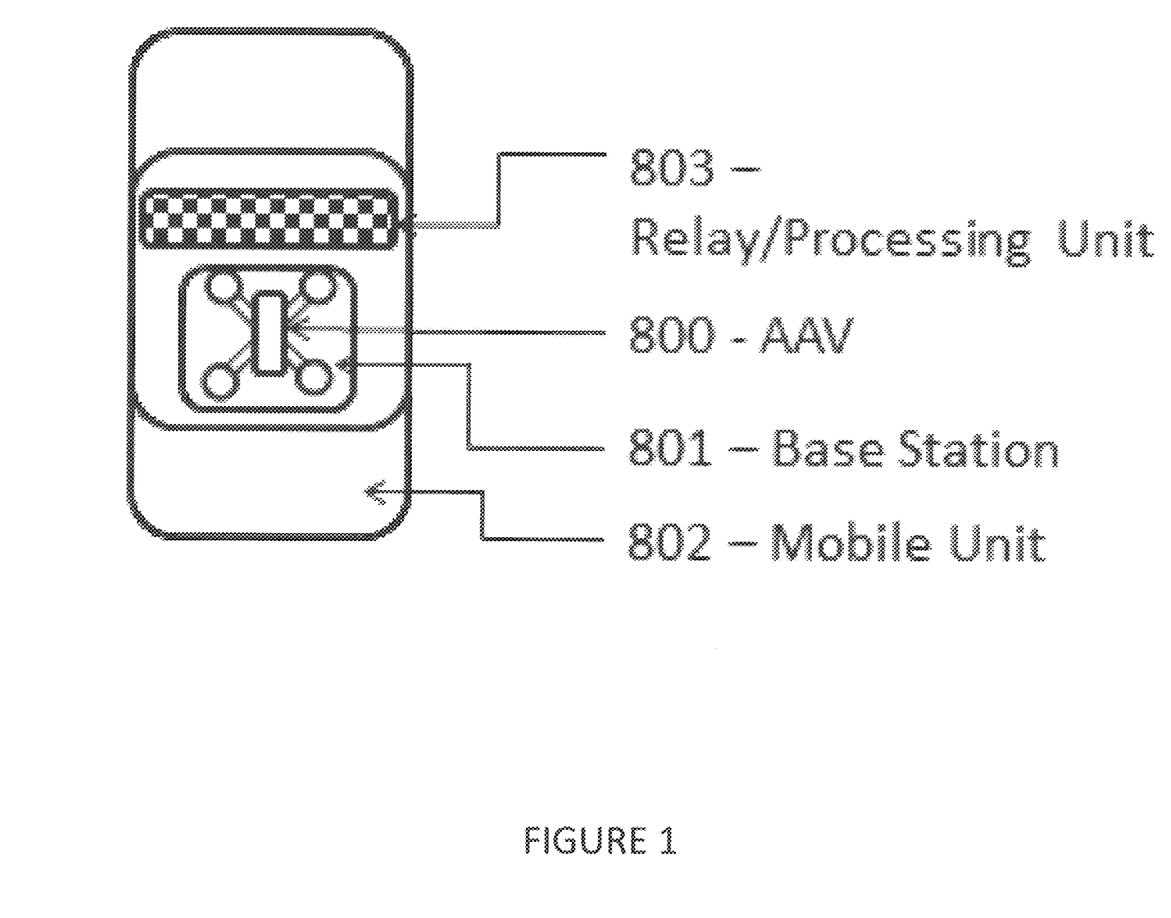
FIG. 1 depicts the primary functional components of the present invention.

Referring to FIG. 1 shows the system components of the present invention comprising the autonomous assistant vehicle (AAV) 800, the base station 801, the mobile unit 802, and the relay/processing unit 803.

Figure 2:
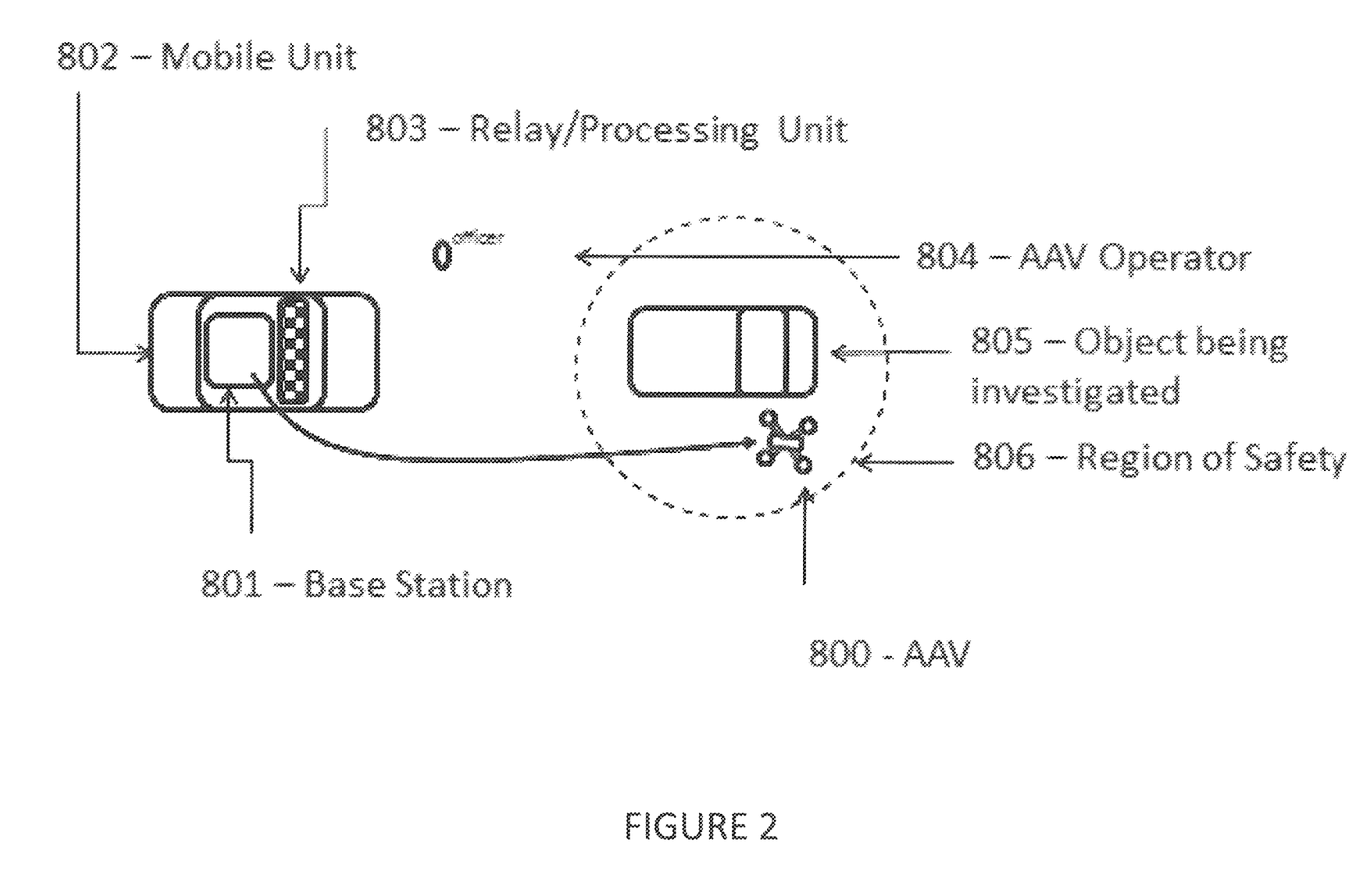
FIG. 2 depicts the interaction of the primary components of the present invention as it is intended to be used.

Referring to FIG. 2, The AAV 800 is mounted on a vehicle 802 operated by a AAV user 804 (herein referred to as user) and is deployed by the user 804 on an as needed basis to perform assistance in gathering data for situational monitoring, safety information, and adjudication of procedures.

FIG. 2 depicts an exemplar scenario in which the user 804 deploys the AAV 800 to monitor a designated vehicle, motorist, or suspicious event.

Still referring to FIG. 2, the AAV 800 can be sent out prior to the user approaching the suspicious object 805. The AAV 800 utilizes its on-board sensors to scan the vehicle 805 and alert the user (e.g., a law enforcement officer) if it detects any suspicious objects. Sensors will be used for the detection of weapons, illegal substances, impaired drivers, driver identification, etc. However, computationally heavy processing, such as facial recognition to compare suspects against a database of known/wanted criminals will be executed using a high performance specially designed computer located on board the AAV base station 801. Short-proximity, low-latency, high-bandwidth communications will enable high speed secure data transmission to/from AAV 800 to/from the base station 801 for processing computationally intensive tasks. Similarly, voice recognition can be used to identify suspects (one such example is voice activation on Moto-X phone). Also the AAV 800 can be outfitted with modules to enable remote interaction between the operator and suspect. The AAV 800 can also be used to cause a diversion, if necessary. The clear advantage of such a system is that is the reduction in uncertainty and increased safety of the officers at minimal cost.

A careful review of current UAV technologies reveals that this risk can be, and should be reduced through situation awareness. The advancements of technologies such as: improvements to battery life, miniaturization of electronics, enhanced algorithms for computer vision, and teleoperation control of remotely piloted and autonomous vehicles provide the key building blocks to develop an AAV that will provide meaningful situational awareness.

Figure 3:
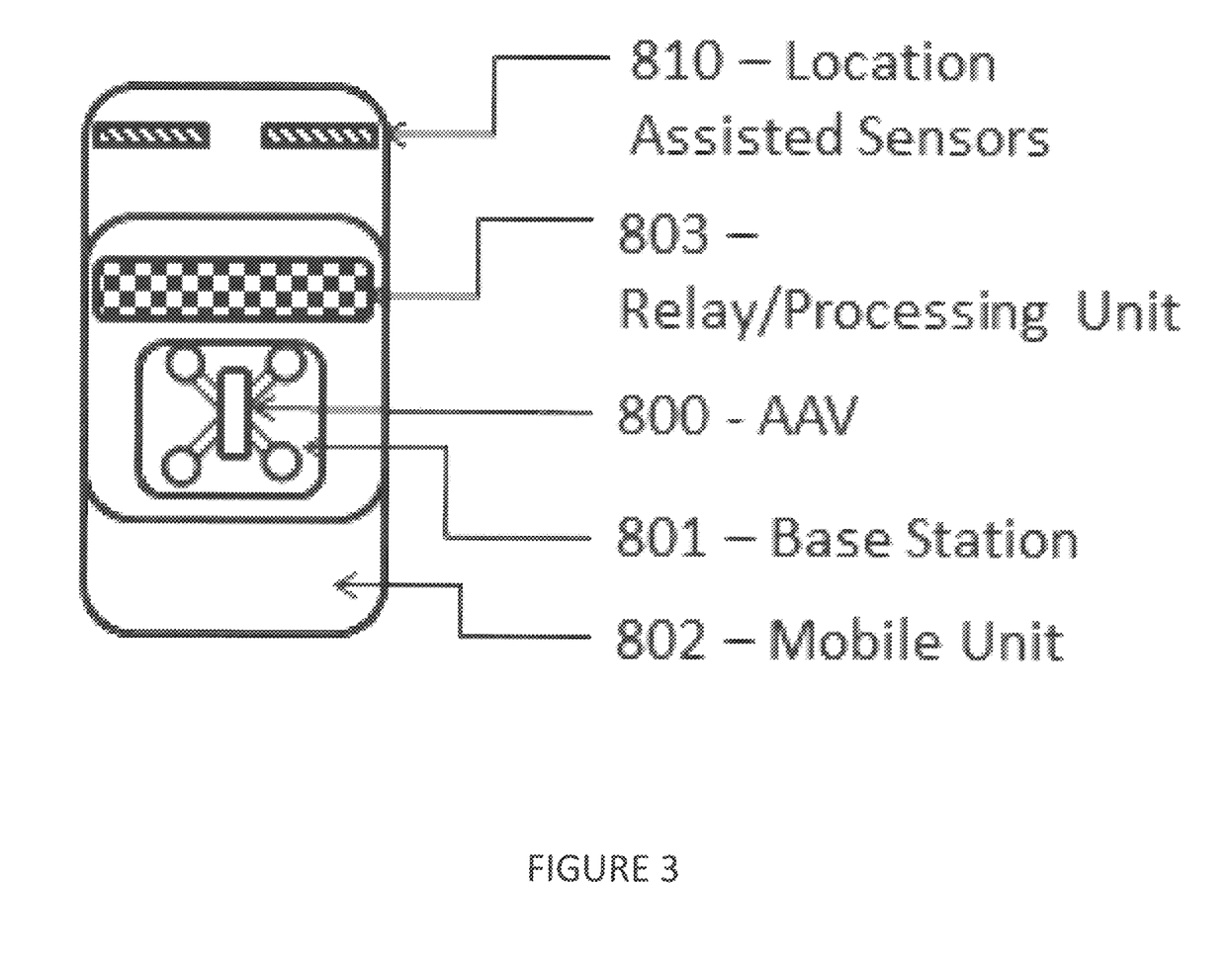
FIG. 3 depicts the primary functional components of the present invention with the addition of location assisted sensors.

Referring to FIG. 3, the present invention essentially consists of two major components: the base station 801 and AAV 800 (quad rotor or another similar flying platform) with location assisting and monitoring sensors 810.

Figure 4:
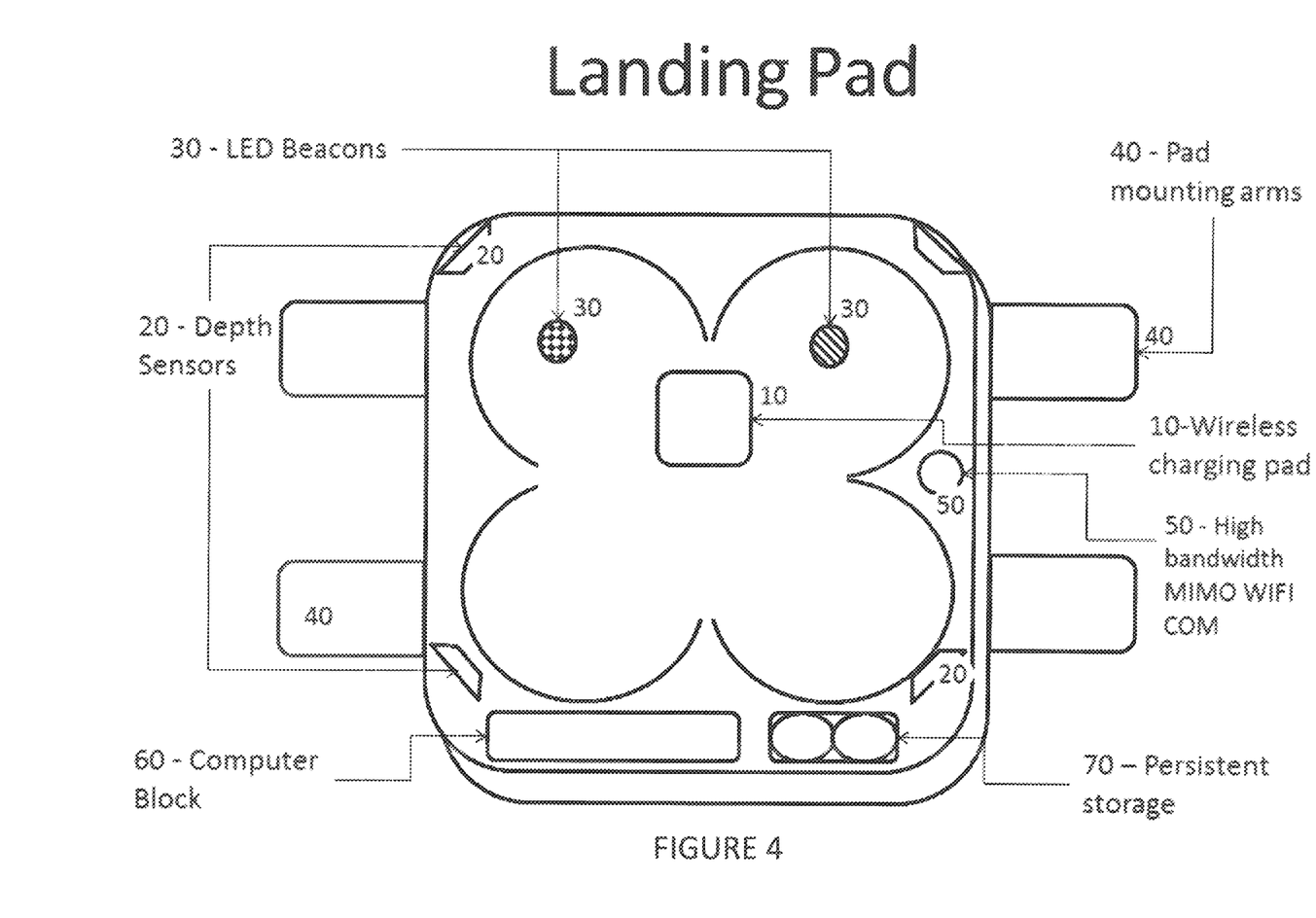
FIG. 4 depicts the landing pad of the present invention showing integrated features for communications, processing, and sensing.
Figure 8:
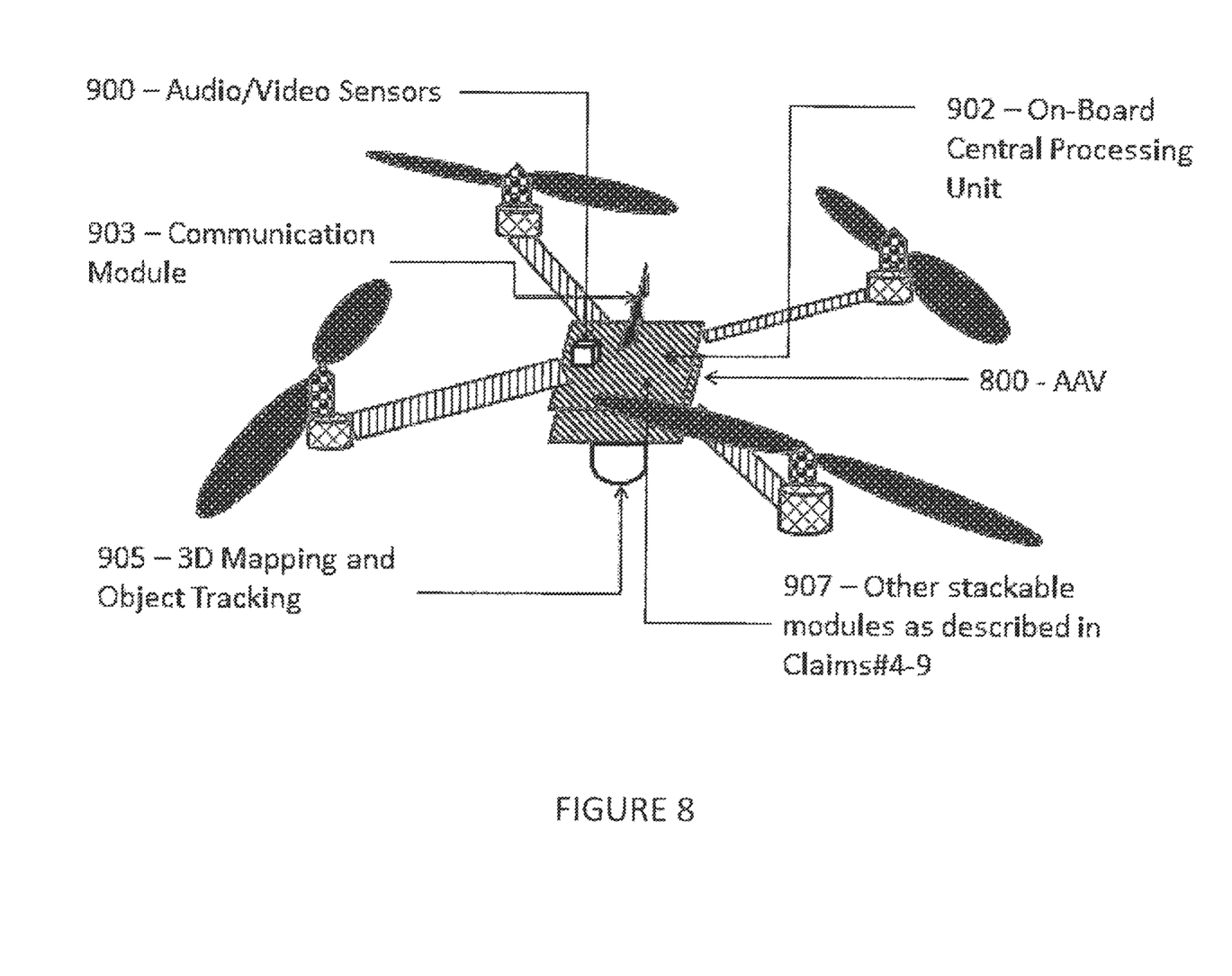
FIG. 8 is a functional diagram of a typical autonomous vehicle used in the present invention.

Referring to FIG. 4, the base station 801 (see FIG. 3) contains integrated processing and storage, Kinect like 3D depth/localization assisted sensors 20, charging station 10, and communications modules 50. The quad rotor AAV 800 (see FIG. 8) is designed to be relatively cheap and replaceable with minimal set of sensors required to do its mission.

Design Details

Mounting of AAV 800 on the host vehicle (see FIG. 3) entails placing the landing pad (or base station, see FIG. 3) 801 of the AAV 800 on the roof of the host vehicle 802 other mobile unit, see FIG. 3) behind the lights to minimize the air draft while the vehicle 802 is in motion. The landing pad 801 will have sloped edges that rise above the parked AAV 800 to reduce the draft. Also, the landing pad 801 edges can be curved around the shape of the AAV 800 to further reduce the draft. In scenarios of use, the AAV 800 can change its shape to reduce air drag (e.g., fold propellers).

The base station (also used as a landing pad) 801 will serve as a multi-purpose device to secure storage of the AAV 800 while not in use. The present invention uses magnetic points and LED beacons 30 on the landing pad 801 for assisted alignment with landing. To reduce air drag, the base station houses the AAV 800 when not in flight and provides wireless charging for the AAV 800 whereas the landing pad 801 has a built-in inductive charger 10. The landing pad 801 can provide multi-input multi-output, high bandwidth, short proximity wireless communications 50 with the AAV 800. The landing pad 801 contains necessary computer hardware infrastructure 60 to execute computationally intensive tasks on behalf of AAV 800 such as but not limited to object recognition, facial recognition, voice recognition, sensor fusion, mapping of the environment, 3D tracking and other computationally intensive tasks. The landing pad 801 provides storage 70 for video, audio, and other fused data. The present invention base station 801 also provides host external sensors for enhanced mapping and tracking of objects in 3D space, 20. There are the reduction of cost benefits to the present invention in that the charging station 10 and base station 801 can contain the majority of the specialized hardware. The AAV 800 is contemplated to be relatively cheap and replaceable; in the case one gets destroyed. The localization sensors 810 (Kinect-like) (see FIG. 3) mounted on the vehicle 802 can be used to create 3D images of the area around the host vehicle 802 using on-board 3D object mapping and tracking means 905 (see FIG. 8). The user/officer can select the object on the display and task the AAV 800 to scan it. Another way to deploy the AAV 800 is to utilize Google Maps by selecting waypoints of interest on a map. A third way is to let the user, using the assisted control, guide the AAV 800.

Figure 5:
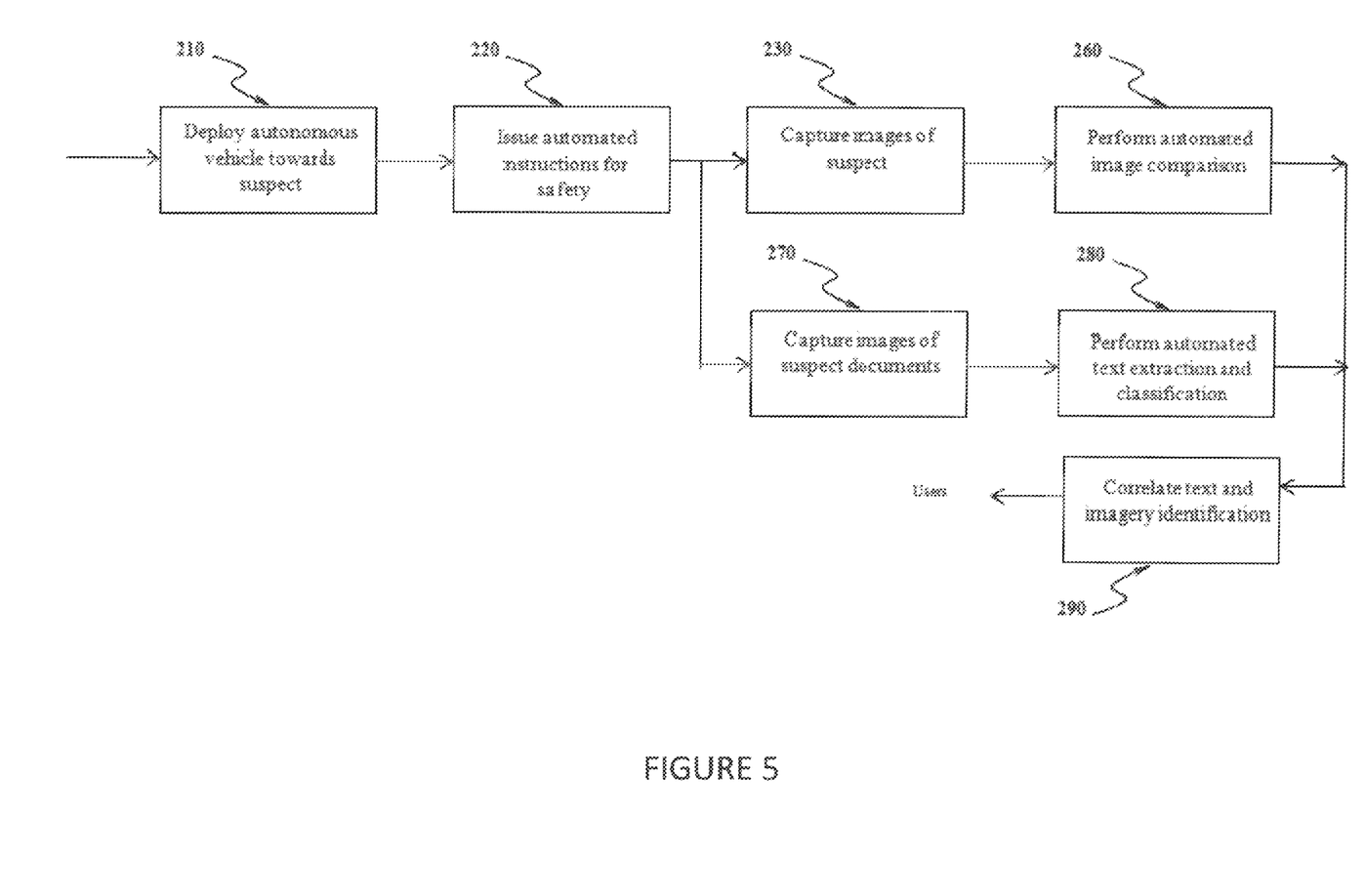
FIG. 5 depicts the sensor data processing steps performed as a result of an autonomous vehicle interaction with a suspect.

Referring to FIG. 5, describes using the AAV 800 to interact with the suspect object. Once the AAV is deployed 210, the user can issue instructions to the suspect object such as a person in the vehicle, 220, using audio and video sensors 900 in combination with some on-board processing 902 (see FIG. 8) to: show your license and registration, place your arms on the steering wheel, or raise them into the air, etc. The AAV 800 can take the image of the documents 270, or image of suspect 230, run through database, and perform automated image comparison 260 and text classification 280 for data correlation and fusion 290 and do other processing as necessary.

Figure 6:
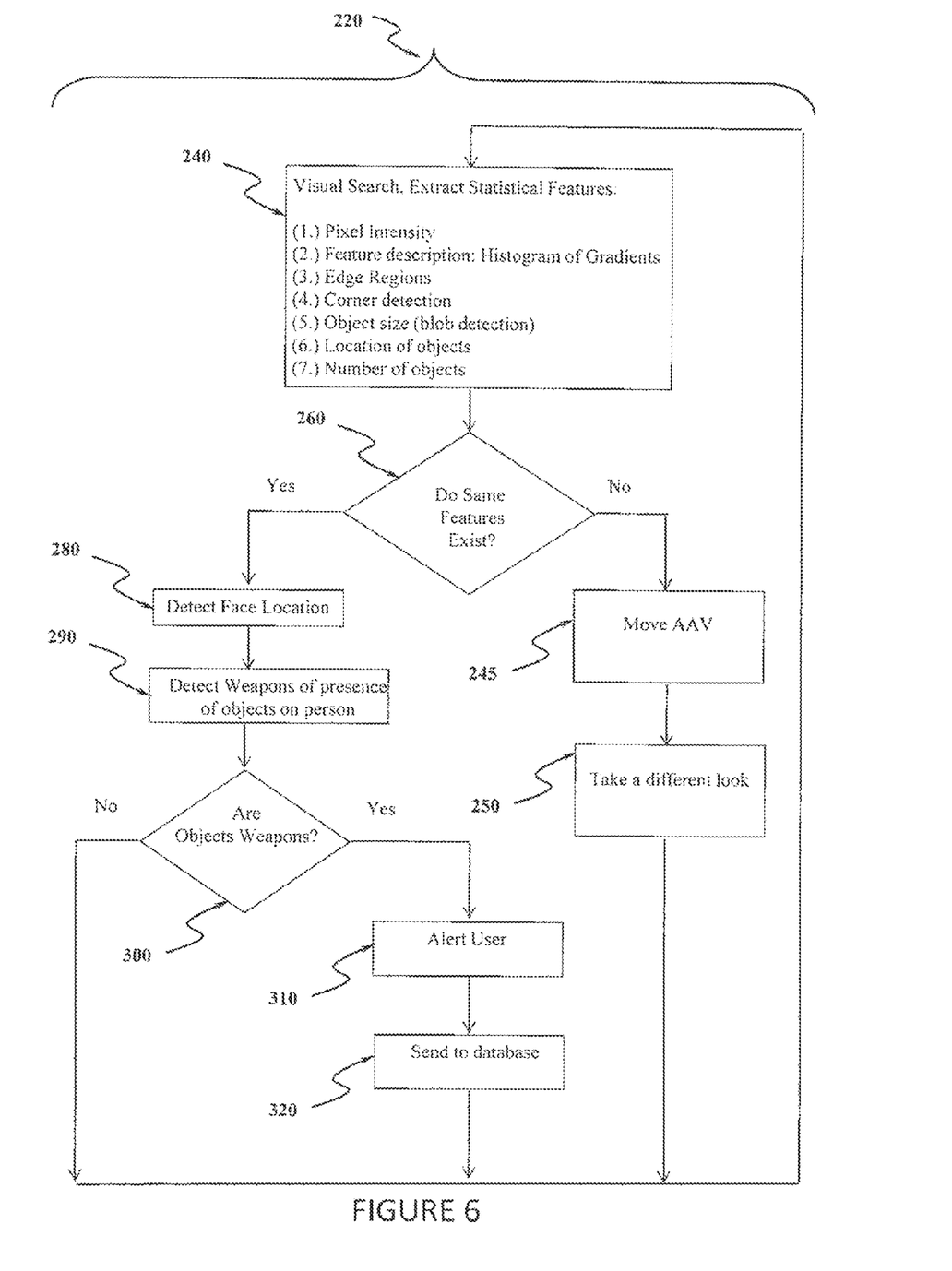
FIG. 6 depicts the steps performed by the autonomous vehicle when interacting with a suspect.

Referring to FIG. 6, if features are detected using AAV imaging sensors 260, the invention can perform the facial recognition 280, and check for features of dangerous items such as firearms, knives 290, 300. Face recognition 280 can then be check/run against a wanted list 320 and check for weapons. Once a potentially dangerous object is detected, the officer can be alerted 310 visually, vocally and/or through vibration using cellphone, smartwatch, inside officers vehicle, and other devices. The alerts can be discrete or perceivable to local observers. If features are not detected, the AAV can be repositioned to take another look 250. In using the AAV 800 to cause a distraction, given a scenario where a situation becomes dangerous—say a suspect pulls a weapon—the AAV 800 can use a speaker, a visual flash, a spray mace/paper-spray on subject to temporarily distract or immobilize the suspect. Special sensors 907 (see FIG. 8) can be attached to the AAV 800 to check for presence of alcohol, drugs, biological, and nuclear materials. Information collected and transferred via a communications module 903 (see FIG. 8) in real-time to an information fusion center can be used as dedication of valid legal procedures of the officer and interaction with suspect for the future legal investigations. The AAV 800 will have rims around propellers to prevent any damage during accidental bumping with the environment menus.

Figure 7:
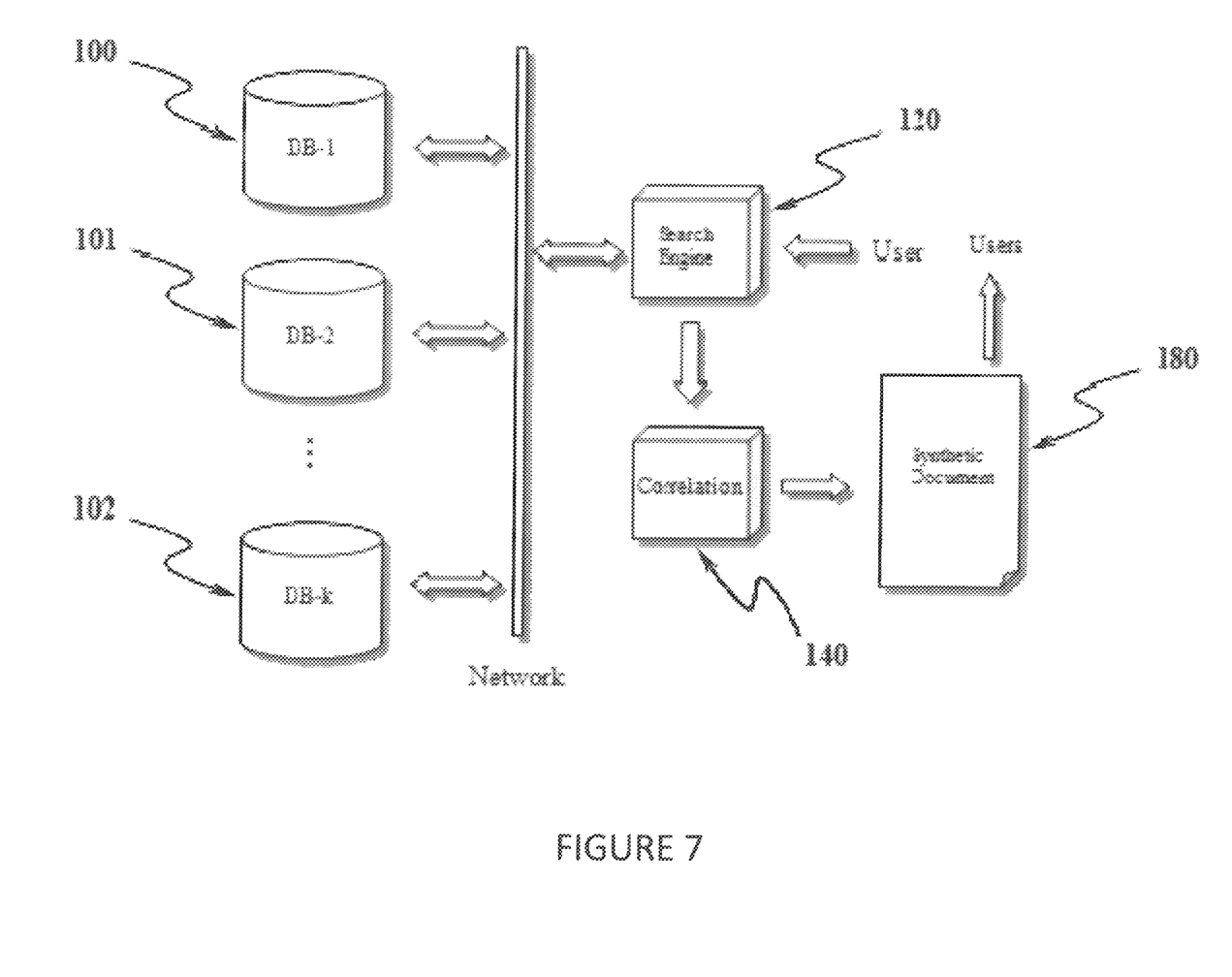
FIG. 7 depicts the present invention access to various databases.

Referring to FIG. 7, the present invention performs multi sensor correlation. Image recognition 100, voice recognition 101, and other source databases 102 can be searched, fused, and correlated 140 to provide a complete operating picture for the law enforcement such as in the form of a synthetic document 180. A user defined operating picture allows the enforcement officials to access a database 100, 101, 102 with various search parameters.

What is claimed is:

1. In a system having an autonomously controlled air vehicle and a base station capable of communicating with each other, a method for employing autonomously controlled air vehicles to reduce risk during suspect investigation, comprising the steps of:
- deploying an autonomously controlled air vehicle towards suspect;
- issuing instructions through said autonomously controlled air vehicle;
- capturing images of said suspect;
- capturing images of document said suspect produces in response to said instructions;
- communicating said images from said autonomous air vehicle to said base station;
- performing image comparison; and
- performing text extraction and classification; and correlating said text and said image identification; and
- extracting statistical features wherein said step of extracting further comprising the step of performing:
  - pixel intensity;
  - feature description;
  - edge region detection;
  - corner detection;
  - object size determination;
  - object location determination;
  - object quantity determination; and
- wherein when said statistical features exist, said step of extracting further comprises the steps of:
  - determining the location of said suspect's face;
  - determining the location of weapons;
  - when weapons are detected, then
    - alerting user; and
    - relaying said statistical features through said base station to remote databases;
- otherwise when no statistical features exist,
  - repositioning said autonomously controlled air vehicle to obtain an alternate view of said suspect.

* * * * *